------- AQUEOUS FLOW
———— ORGANIC FLOW

INVENTORS
VINCENT CHIOLA,
JOSEPH J. CLEVELAND, &
GEORGE J. KAMIN

BY Donald R. Castle
ATTORNEY

United States Patent Office 3,582,264
Patented June 1, 1971

3,582,264
PROCESS FOR SEPARATING RARE EARTHS
Vincent Chiola, Joseph J. Cleveland, and George J. Kamin, Towanda, Pa., assignors to Sylvania Electric Products Inc.
Filed Sept. 16, 1969, Ser. No. 858,340
Int. Cl. C01f 17/00; C22b 59/00
U.S. Cl. 23—23
4 Claims

ABSTRACT OF THE DISCLOSURE

In the process for separating the lighter rare earth elements from heavier rare earth elements wherein an aqueous feed stream containing a mixture of both lighter and heavier rare earth elements flows through a plurality of extraction stages and an organic extractant solution that preferentially extracts the heavier rare earth elements flows counter-current to and in contact with the aqueous feed stream, the resulting loaded organic solution is separated from the aqueous solution, scrubbed with an aqueous scrub solution, separated therefrom and used as a feed for further separation, an improvement is achieved by adjusting the pH of the scrub solution after the scrubbing step to between about 5 and about 7 and adding the adjusted scrub solution to an extraction stage downstream from the feed solution entry stage. Improvements in extraction and scrubbing efficiency are achieved.

CROSS-REFERENCES TO RELATED APPLICATIONS

The process as disclosed in U.S. patent application, Ser. No. 703,027 filed Feb. 5, 1968, now U.S. Pat. 3,482,932 and assigned to the same assignee as the instant invention and incorporated herein by reference, overcomes many of the problems that confronted the industry and enables relatively high production rates of purified yttrium.

Any water-immiscible organic extractant solution that preferentially extracts heavier rare earths from lighter rare earths can be used in practice of this invention such as those described in U.S. patent application Ser. No. 703,027, now U.S. Pat. No. 3,482,932 and the extraction solution described in co-pending U.S. patent application, Ser. No. 858,341, filed concurrently herewith.

Scrubbing time and the amounts of scrubbing solution in relation to the extraction solution will vary as discussed in co-pending U.S. patent application Ser. No. 858,540, filed concurrently herewith and incorporated herein by reference.

BACKGROUND OF THE INVENTION

This invention relates to improved solvent extraction techniques that are used in the separation of rare earth elements.

In recent years there has been a large demand for highly pure rare earth materials particularly those of the lanthanide series including yttrium. Several techniques are known to obtain separation of certain rare earths. Solvent extraction processes such as disclosed in U.S. Pat. 3,110,556 did not achieve the purity desired for some purposes. Ion exchange techniques in some instances yielded relatively pure materials, however, the capacity of these units at practical design sizes was too low for most commercial production.

As can be appreciated, one of the problems that confronts the industry in obtaining a pure rare earth material such as yttrium, gadolinium and the like is that the sources of these materials contain numerous other rare earth elements. In most instances generally most of the lanthanide series are contained within a given raw material source. To obtain satisfactory separation and purification is difficult because of the similarities between the various elements.

In the beforementioned U.S. patent application Ser. No. 703,027 now U.S. Pat. 3,482,932 a satisfactory commercial process is disclosed for the separation of yttrium. The process disclosed therein comprises an extraction step wherein the lighter and heavier rare earths are separated by preferentially extracting the heavier rare earths into an organic phase, and an ion exchange step wherein yttrium is separated from the other heavier rare earths. The present invention offers an improvement to that process for the purification of yttrium and additionally will provide an improvement to the purification of any heavy rare earth that is desired. In the process previously disclosed it is preferred to scrub the organic extractant solution that is laden with the heavy rare earths with an acid such as nitric acid prior to supplying the organic to the ion exchange step. The acid scrub solution that contains a variety of rare earth values is combined with the aqueous feed solution and flows counter-current to the flow of the organic extractant in a multi-stage extraction step. For purposes of clarity the following definitions will be used. "Downstream" as used herein is in reference to the direction of flow of the aqueous feed solution. The extraction stage that the feed solution and scrub solution are first contacted with organic extractant solution that is partially loaded with heavy rare earths will be referred to herein as the "initial feed solution entry extraction stage." The extraction stage at which the aqueous phase exits and the organic extraction phase enters will be referred to herein as the "initial extraction solution entry extraction stage." "Intermediate" extraction stages refer to those stages between the initial feed solution entry extraction stage and the initial extraction solution extraction stage.

As previously mentioned the acid scrub solution after contacting the loaded organic extraction solution enters at the initial feed solution extraction stage in the prior art process. In the foregoing process, the extraction efficiency was increased by using counter-current flow that is having the aqueous phase that was the lowest in heavy rare earth content contact the unloaded organic extraction solution. It is believed, therefore, that a process that improves the overall extraction efficiency of a multi-stage extraction step used in the preparation and purification of rare earths would be an advancement in the art.

SUMMARY OF THE INVENTION

In accordance with one aspect of the present invention there is provided an improvement to a process for separating and purifying rare earth material wherein a first extraction step is used to separate the light and heavy rare earths and thereafter the phase containing the heavier rare earths is further processed to separate the particular rare earth desired from the other heavier rare earths. The improvement comprises scrubbing the organic extraction phase that is loaded with the heavier rare earths with an aqueous acidic scrub solution, adjusting the pH of the aqueous acidic solution after scrubbing to between about 5 and 7 and adding the adjusted solution to the extraction step at an intermediate stage to thereby increase the efficiency of the extraction step.

Figure 1:
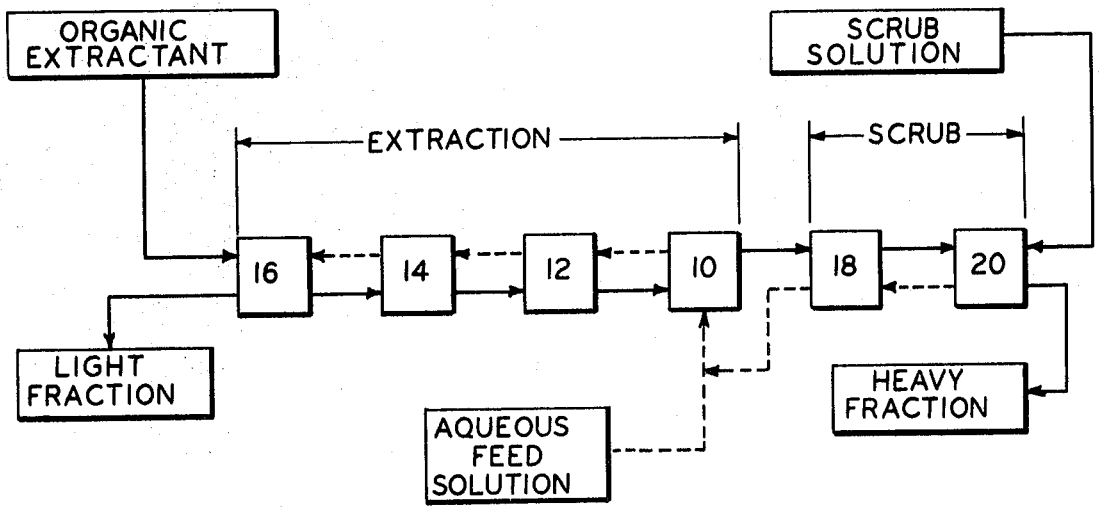
FIG. 1 is a flow sheet of a prior art process.

For a better understanding of the present invention, together with other and further objects, advantages and capabilities thereof, reference is made to the following disclosure and appended claims in connection with the above brief description of the drawings and some of the aspects of the invention.

DESCRIPTION OF THE PREFERRED EMBODIMENTS

In the extraction step the heavier rare earths replace hydrogen ions in the organic. The released hydrogen ions, therefore, concentrate in the aqueous phase thereby lowering the pH of the aqueous phase as it bceomes depleted of the heavier rare earth elements. Although the organic preferentially extracts heavier rare earths (atomic numbers 65 to 70 and yttrium) some lighter rare earths (atomic numbers 57 through 64) are also extracted. The aqueous acidic scrubbing solution is used to provide hydrogen ions and thus preferentially release lighter rare earths. Thus the organic extract solution after scrubbing has a relatively low lighter rare earth content. Although the lighter rare earths are preferentially released into the scrubbing solution and some hydrogen ions are replaced thereby, the pH of the solution is rather low even after scrubbing, that is, it is generally lower than about 3.

In the practice of this invention the pH of the scrub solution is adjusted to a value of from about 5 to about 7. Recycling of the adjusted scrub solution at a stage intermediate to the initial feed solution entry extraction stage and the organic extraction solution entry extraction stage increases the extraction efficiency of all extraction stages. The extraction stages upstream from the point of entry of the scrub solution are improved due to higher-concentration of the heavier rare earths than is achieved by the prior art processes. The stages downstream are improved due to the higher pH achieved in the aqueous phase.

As previously mentioned, the organic extractant solution after it leaves the initial feed solution entry extraction stage is scrubbed with an aqueous acidic solution that has a relatively low pH, generally below about 1. The lighter rare earths are preferentially removed from the organic phase and replace hydrogen ions in the scrub solution, thereby raising the pH of the scrub solution. In most instances the pH of the scrub solution, after scrubbing, is below about 3. It is adjusted to a pH of about 5 to about 7 by the addition of a base. Aqueous solutions of alkali metal bases or ammonium hydroxide are preferred. Aqueous ammonium hydroxide solutions containing from about 5% to about 20% by weight of ammonium hydroxide are especially preferred because the ammonium salts that result from the neutralization are highly water soluble.

Although any mineral acid such as nitric, hydrochloric, and sulfuric can be used, it is preferred to use nitric acid from an efficiency and cost standpoint.

To more fully illustrate particular preferred embodiments of the subject invention, the following detailed examples are present. All parts, proportions and percentages are by volume unless otherwise indicated.

Example I

Using a sulfuric acid digestion, water leaching and oxalic acid precipitation, xenotime ore containing rare earth values is converted to rare earth oxalates. The oxalate is then fired to oxides and slurried in water, nitric acid is added to convert the oxides into water soluble rare earth nitrates. Addition of ammonium hydroxide results in the precipitation of some cerium and thorium hydroxides. After removal of these hydroxides the pH is adjusted to about 1.75 and the concentration is adjusted to a rare earth oxide content of about 136 grams per liter on a first portion of the feed solution. In a second portion the pH is adjusted to about 1.0 and the rare earth oxide concentration is adjusted to about 60 grams/liter. An organic extraction solution is prepared containing about 28 parts by volume of tridecylphosphoric acid, 20 parts by volume of tributylphosphate and 52 parts by volume of kerosene.

Figure 2:
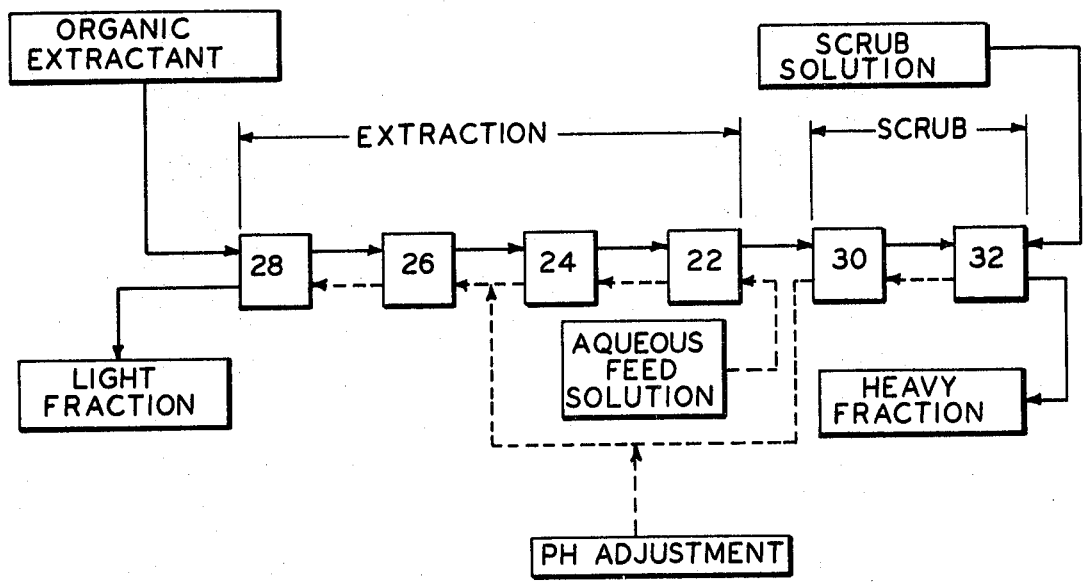
FIG. 2 is a flow sheet of the process of the present invention.

The first portion is used as a feed solution for the process that has a typical flow sheet as illustrated in FIG. 1. The second portion is used as a feed solution for the process that has a typical flow sheet as illustrated in FIG. 2.

With particular reference to FIG. 1, the extraction step consists of four stages, 10, 12, 14 and 16 and the scrubbing step is conducted in two stages, 18 and 20.

feed solution flow af about 3.5 parts/minute is established at the feed solution entry extraction stage 10, and an organic extraction solution flow af about 21 parts/minute is established at the organic extraction solution entry extraction stage 16. The loaded organic after leaving extraction stage 10 is fed to a first scrubbing stage 18 and then to a second scrubbing stage 20 to which a scrub solution of an aqueous nitric acid solution adjusted to a pH of about 1.75 is fed. The flow of the scrub solution is established at about 12 parts/minute. The scrub solution exits from the scrubbing step from scrub stage 18 and is combined with the feed solution and enters the extraction step at stage 10. The depleted aqueous phase flows from stage 10 to 12 to 14 to 16 and exits from extraction stage 16 which is also the entry stage for the organic extraction solution.

The system, as described above, is operated for about 100 hours at the beforementioned flow rates. Samples are collected for about 2 hours after every 10 hours of operation. The light fraction is taken as the aqueous phase exits from the extraction step. The heavy fraction is taken as the organic phase exits from the scrubbing step. The rare earth values are precipitated by the addition of oxalic acid, then the oxalates are converted to oxides by heating and then analyzed. The following results are obtained by spectrographic analysis:

In the heavy rare earth fraction Eu and Nd are detected in the 10–100 p.p.m. range; Ce, Gd, La, Pr, Sm and Tb are detected in the 0.01 to 0.1% range; Er and Tm are detected in the 0.1% to 1.0% range; Dy, Ho and Yb are detected in the 0.5 to 10% range and Y is detected in amounts above 10%. The foregoing data indicates levels of the lighter rare earths lanthanum through gadolinium (atomic numbers 57 to 64) are higher than that desirable for separation and purification in subsequent steps.

In the light rare earth fraction, the heavy rare earths (atomic numbers 65 through 70 and yttrium) were found to be present in amounts of from about 0.01% to 0.1% for Tm and Yb; to about 0.05 to about 0.5% for Ho; to about 0.1% to 1% for Dy and Tb and between 1% and 10% for Er and Y. The above data indicates losses of the heavier rare earths.

With particular reference to FIG. 2, the extraction step consists of extraction stages 22, 24, 26 and 28 and the scrubbing step consisting of two scrubbing stages 30 and 32.

The second portion of the feed solution at a pH of about 1.0 is fed to the feed solution entry extraction stage 22 at a rate of about 8.4 parts/minute. The organic extraction solution as previously described, is fed to the extraction solution entry extraction stage 28 at the rate of about 21 parts/minute. The loaded organic phase exits from extraction stage 22 and is fed to the first scrub stage 30 and then to the second scrub stage 32. The scrub solution consisting of an aqueous solution of nitric acid at a pH of about 0.2 is fed to the second scrub stage 32 at a rate of about 12 parts/minute. The scrub solution exits from the first scrub stage 30 and is adjusted to a pH of from about 5.5 to about 6.0 with a 10% weight aqueous ammonium hydroxide solution. The adjusted solution is fed into the intermediate extraction stage 26 instead of the initial stage 22 as is done in the previous run.

Samples are taken, treated and analyzed as in the previous run. Spectrographic analyses indicate the following results:

In the heavy fraction, only gadolinium of the lighter rare earths (atomic numbers 57–64) is detected and in amounts of less than 500 p.p.m.; and the concentration of each of the heavier rare earths and yttrium are increased in the heavy fraction.

In the light fraction, the following amounts of heavier rare earths are detected: Dy, Tb, Tm, Y and Yb less than 1% and Er and Ho less than 0.1%.

The foregoing two runs illustrates that even though the overall throughput in the last run on the basis of rare earth oxides is increased about 6% above the first run due to the higher flow rates of feed solution, the separation efficiency between the heavier and lighter rare earths is increased. In the heavy fraction virtually no light rare earths were detected on the second run. In the light fraction the heavier rare earths were detected in amounts of from 1% to 10% in the first run while in the second run the amounts of heavier rare earths in the light fraction were below 1% and generally between 0.1% and 1%, thus indicating a higher efficiency in the second run. It is to be noted that when compared with the preferred processes known in the prior art as illustrated in U.S. patent application Ser. No. 703,027 now U.S. Pat. 3,482,932 that an increase in throughput based on the rare earth oxide content of about 3.5 times is achieved. The foregoing process, as illustrated in the foregoing application, is believed to have the highest throughput and separation efficiency of any process previously known.

In the above example purification and separation of the heavier rare earths from a feed solution containing essentially all of the lanthanide series and yttrium is illustrated. It is to be noted that in the manufacture of cathodoluminescent phosphors that yttrium is one of the desired elements. The above process has been found to be extremely useful in separating yttrium from a mixture of yttrium and the lighter rare earths.

In co-pending U.S. patent application Ser. No. 873,128, a solvent system is disclosed for the purification of gadolinium oxide. In this instance it is the purification of the lighter rare earth, gadolinium that is desired. The subject process can be used to purify either light or heavy rare earths. The purification is achieved through the improved efficiency of the extraction step whether it is desired to purify the lighter or heavier rare earth element.

It is to be further noted that the number of extraction stages, scrubbing stages and the like will vary depending upon the particular organic extraction solution that is used, the purity of the rare earth source and other design factors.

While there has been shown and described what are at present considered the preferred embodiments of the invention, it will be obvious to those skilled in the art that various changes and modifications may be made therein without departing from the scope of the invention as defined by the appended claims.

We claim:
1. In a process wherein lighter rare earth elements having an atomic number from 57 through 64 and heavier rare earth elements having an atomic number 65 through 70 and yttrium are separated by a solvent extraction step having a plurality of extraction stages and wherein a feed solution containing a mixture of light and heavy rare earth elements flows counter-currently to an organic extraction solution and wherein said organic extraction solution, after the extraction stage is scrubbed with a scrub solution containing hydrogen ions, the improvement comprising:
 (a) adjusting the pH of said scrub solution after said scrubbing step to a value of from about 5 to about 7,
 (b) adding said adjusted scrub solution to an intermediate extraction stage downstream from the initial feed solution entry stage.

2. A process according to claim 1 wherein said pH is from about 5.5 to about 6.0.

3. A process according to claim 1 wherein at least about 3 extraction stages are used.

4. A process according to claim 3 wherein the concentration of rare earth on an oxide basis in said feed solution is at least about 60 grams per liter.

References Cited

UNITED STATES PATENTS

| | | | |
|---|---|---|---|
| 2,955,913 | 10/1960 | Peppard et al. | 23—23 |
| 3,110,556 | 11/1963 | Peppard et al. | 23—23 |
| 3,302,993 | 2/1967 | Bray | 23—23 |
| 3,482,932 | 12/1969 | Gump | 23—22 |

HERBERT T. CARTER, Primary Examiner

U.S. Cl. X.R.

23—24, 312